United States Patent
Chen et al.

(10) Patent No.: US 11,215,746 B2
(45) Date of Patent: Jan. 4, 2022

(54) DUAL DISPLAY DEVICE

(71) Applicant: Coretronic Corporation, Hsin-Chu (TW)

(72) Inventors: Hui-Chuan Chen, Hsin-Chu (TW); Yu-Fan Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/202,368

(22) Filed: Mar. 16, 2021

(65) Prior Publication Data

US 2021/0294019 A1  Sep. 23, 2021

(30) Foreign Application Priority Data

Mar. 19, 2020  (CN) .......................... 202020349210.2

(51) Int. Cl.
*F21V 8/00* (2006.01)

(52) U.S. Cl.
CPC ......... *G02B 6/0053* (2013.01); *G02B 6/0056* (2013.01); *G02B 6/0068* (2013.01)

(58) Field of Classification Search
CPC ... G02B 6/0053; G02B 6/0056; G02B 6/0068
See application file for complete search history.

(56) References Cited

U.S. PATENT DOCUMENTS

| | | | |
|---|---|---|---|
| 8,049,840 B2 | 11/2011 | Akiyama | |
| 9,436,037 B2 | 9/2016 | Ning | |
| 9,791,613 B2 | 10/2017 | Shei et al. | |
| 9,857,525 B2 | 1/2018 | Huang | |
| 10,048,538 B1 | 8/2018 | Fukuoka et al. | |
| 10,056,048 B2 | 8/2018 | Kim | |
| 10,088,700 B2 | 10/2018 | Zhang et al. | |
| 10,409,109 B2 | 9/2019 | Fan | |
| 2003/0231483 A1 | 12/2003 | Higashiyama | |
| 2005/0046321 A1 | 3/2005 | Suga et al. | |
| 2007/0086210 A1 | 4/2007 | Miyashita | |
| 2008/0106915 A1 | 5/2008 | Okuda | |
| 2008/0112189 A1 | 5/2008 | Okuda | |
| 2008/0239200 A1 | 10/2008 | Hirai et al. | |

(Continued)

FOREIGN PATENT DOCUMENTS

| CN | 104848052 A | 8/2015 |
|---|---|---|
| CN | 208239762 U | 12/2018 |

(Continued)

*Primary Examiner* — Mary Ellen Bowman (57) ABSTRACT

A dual display device includes a light source module, a first display panel and a second display panel. The light source module includes a light guide plate, a first prism sheet, a second prism sheet, a color conversion film, and a light source. The light guide plate has a first light exit surface, a second light exit surface and a light incident surface. The first light exit surface has a plurality of first microstructures. The first prism sheet is disposed beside the first light exit surface. The second prism sheet is disposed beside the second light exit surface. The color conversion film is disposed at least one of between the first prism sheet and the first light exit surface and between the second prism sheet and the second light exit surface. The dual display device of the invention has the advantages of thinner thickness and lighter weight.

9 Claims, 3 Drawing Sheets

(56) References Cited

U.S. PATENT DOCUMENTS

| | | | |
|---|---|---|---|
| 2008/0252823 A1 | 10/2008 | Hwang et al. | |
| 2010/0008067 A1* | 1/2010 | Tai | G02F 1/133611 |
| | | | 362/97.1 |
| 2010/0014027 A1* | 1/2010 | Li | G02B 6/0028 |
| | | | 349/65 |
| 2012/0163021 A1* | 6/2012 | Bohn | G02F 1/133615 |
| | | | 362/608 |
| 2013/0155722 A1* | 6/2013 | Lin | G02B 6/0068 |
| | | | 362/612 |
| 2015/0070903 A1 | 3/2015 | Min et al. | |
| 2017/0219861 A1* | 8/2017 | Fukuoka | G02F 1/133536 |
| 2018/0017726 A1* | 1/2018 | Kim | G02B 6/0065 |
| 2019/0129250 A1* | 5/2019 | Park | G02F 1/1336 |
| 2019/0312181 A1* | 10/2019 | Song | G02B 6/0026 |

FOREIGN PATENT DOCUMENTS

| | | |
|---|---|---|
| CN | 212675319 U | 3/2021 |
| TW | 200627024 A | 8/2006 |
| TW | 201341915 A | 10/2013 |
| TW | 201541148 A | 11/2015 |
| TW | 201643516 A | 12/2016 |
| TW | I631397 B | 8/2018 |
| TW | I685704 B | 2/2020 |

* cited by examiner

DUAL DISPLAY DEVICE

CROSS-REFERENCE TO RELATED APPLICATION

This application claims the priority benefit of China application 202020349210.2, filed on 2020 Mar. 19. The entirety of the above-mentioned patent application is hereby incorporated by reference herein and made a part of this specification.

FIELD OF THE INVENTION

The present invention relates to a display device, and more particularly to a dual display device.

BACKGROUND OF THE INVENTION

A liquid crystal display panel of a liquid crystal display device does not emit light, so a surface light source needs to be provided by a backlight module. The backlight module includes a direct type backlight module and an edge type backlight module. A current common direct type backlight module is to dispose a plurality of light emitting diodes (LEDs) arranged in a two-dimensional array under a diffusion plate. However, although the direct type backlight module has better brightness uniformity, there are disadvantages of thicker thickness.

The current edge type backlight module has a thinner thickness than the direct type backlight module because a LED light bar is disposed on a side of a light guide plate. However, the edge type backlight module in the prior art is paired with a light guide plate and a light source. Therefore, in the dual liquid crystal display device, two sets of backlight modules are needed, which increases the size and weight of the dual liquid crystal display device.

The information disclosed in this "BACK GROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a dual display device having the advantages of thinner thickness and lighter weight.

Other advantages and objects of the invention may be further illustrated by the technical features broadly embodied and described as follows.

In order to achieve one or a portion of or all of the objects or other objects, a dual display device provided in an embodiment of the invention includes a light source module, a first display panel and a second display panel. The light source module includes a light guide plate, a first prism sheet, a second prism sheet, a color conversion film, and a light source. The light guide plate has a first light exit surface and a second light exit surface relative to the first light exit surface, and a light incident surface connected between the first light exit surface and the second light exit surface. The first light exit surface has a plurality of first microstructures. The first prism sheet is disposed beside the first light exit surface of the light guide plate. The first prism sheet includes a plurality of first prism columns disposed on a side of the first prism sheet facing away the first light exit surface. The plurality of first prism columns are arranged along from the light incident surface toward a predetermined direction away from the light incident surface. The second prism sheet is disposed beside the second light exit surface of the light guide plate. The second prism sheet includes a plurality of second prism columns disposed on a side of the second prism sheet facing away the second light exit surface. The plurality of second prism columns are arranged along the predetermined direction. The color conversion film is disposed at least one of between the first prism sheet and the first light exit surface and between the second prism sheet and the second light exit surface. The light source is disposed beside the light incident surface. The first display panel is disposed on a side of the first prism sheet facing away the light guide plate. The second display panel is disposed on a side of the second prism sheet facing away the light guide plate.

In the dual display device of the embodiment of the invention, the light guide plate of the light source module has a plurality of first microstructures, when the light is irradiated on the first microstructures, part of the light may be refracted and emitted from the first light exit surface, and part of the light is reflected and emitted from the second light exit surface to achieve the effect of emitting light on both sides. In addition, since the plurality of first prism columns are disposed on a side of the first prism sheet facing away the first light exit surface, when the light irradiates the first prism sheet, not all of the light would be incident, part of the light would be reflected back to the light guide plate. Similarly, since the plurality of second prism columns are disposed on a side of the second prism sheet facing away the second light exit surface, when the light irradiates the second prism sheet, not all of the light would be incident, part of the light would be reflected back to the light guide plate. Therefore, the number of times the light passes through the color conversion film is increased, and the color conversion efficiency is improved, thereby improving the light utilization efficiency. Therefore, the dual display device of the embodiment of the invention only needs to use one set of the light source module to meet the requirements of double-sided display, having the advantages of thinner thickness and lighter weight.

Other objectives, features and advantages of The invention will be further understood from the further technological features disclosed by the embodiments of The invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
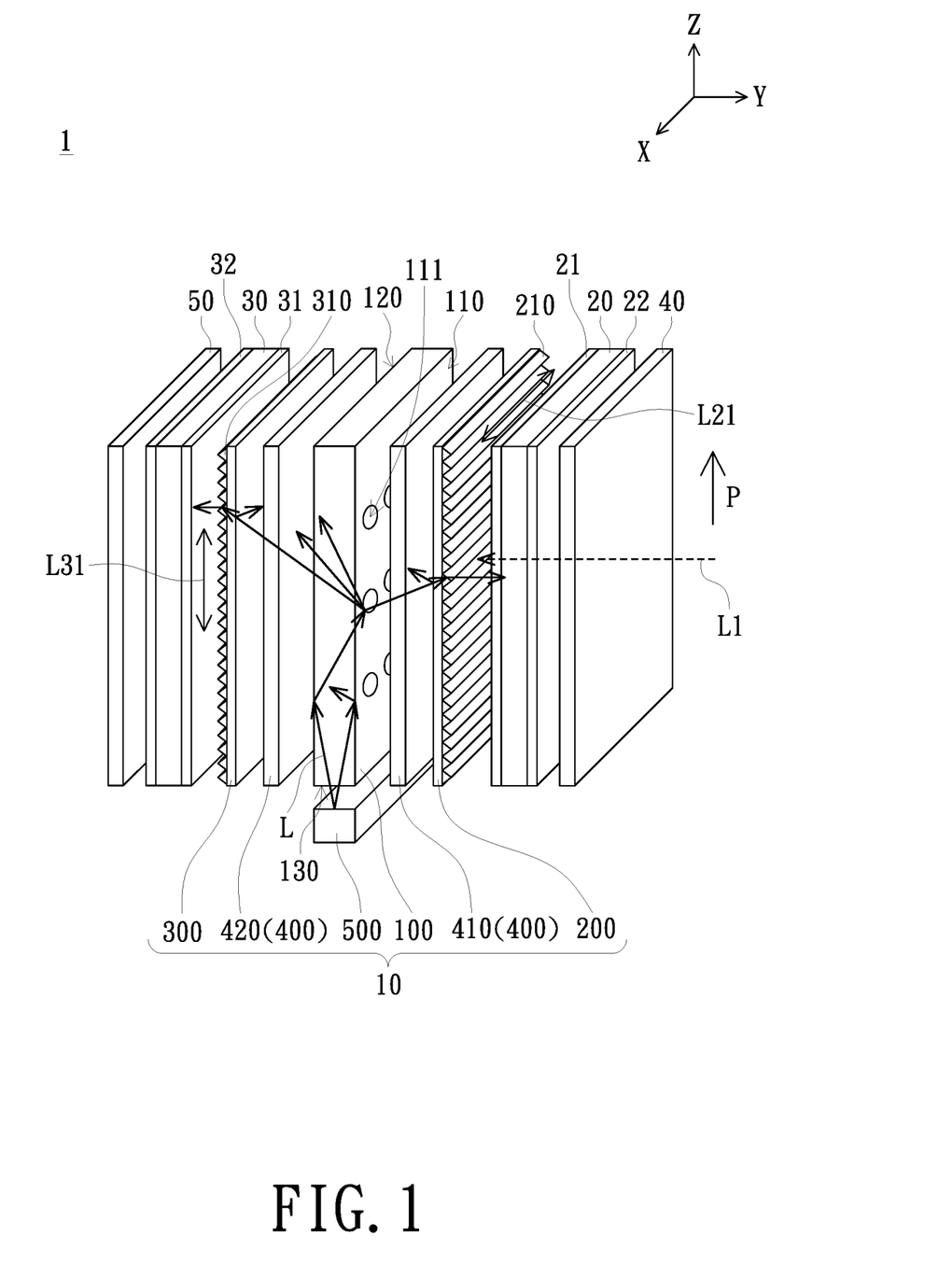
FIG. 1 is a schematic perspective cross-sectional view of a dual display device of one embodiment of the invention.

FIG. 1 is a schematic perspective cross-sectional view of a dual display device of one embodiment of the invention. Referring to FIG. 1, a dual display device 1 of the embodiment includes a light source module 10, a first display panel 20 and a second display panel 30, and the first display panel 20 and the second display panel 30 are respectively disposed on two sides of the light source module 10.

The light source module 10 includes a light guide plate 100, a first prism sheet 200, a second prism sheet 300, a color conversion film 400, and a light source 500. The light guide plate 100 has a first light exit surface 110, a second light exit surface 120 relative to the first light exit surface 110, and a light incident surface 130 connected between the first light exit surface 110 and the second light exit surface 120. The first light exit surface 110 has a plurality of first microstructures 111. The quantity and shape of the plurality of first microstructures 111 are not particularly limited, and the first microstructures 111 are shown by six dots in FIG. 1. The first microstructures 111 are evenly distributed on the first light exit surface 110, for example. In another embodiment, the first microstructures 111 may also be unevenly distributed on the first light exit surface 110. The first prism sheet 200 is disposed beside the first light exit surface 110 of the light guide plate 100, and the first display panel 20 is disposed on a side of the first prism sheet 200 facing away the light guide plate 100. The second prism sheet 300 is disposed beside the second light exit surface 120 of the light guide plate 100, and the second display panel 30 is disposed on a side of the second prism sheet 300 facing away the light guide plate 100. The color conversion film 400 is disposed at least one of between the first prism sheet 200 and the first light exit surface 110 and between the second prism sheet 300 and the second light exit surface 120. In the embodiment, the first color conversion film 410 and the second color conversion film 420 of the two color conversion films 400 are taken as an example, but are not limited thereto. The first color conversion film 410 is disposed between the first prism sheet 200 and the first light exit surface 110. The second color conversion film 420 is disposed between the second prism sheet 300 and the second light exit surface 120. In other embodiments, only the first color conversion film 410 or the second color conversion film 420 may be used. The light source 500 is disposed beside the light incident surface 130 and used to emit light L to enter the light guide plate 100 through the light incident surface 130.

The first prism sheet 200 includes a plurality of first prism columns 210 disposed on a side of the first prism sheet 200 facing away the first light exit surface 110. The plurality of first prism columns 210 are arranged along a predetermined direction P, which is from the light incident surface 130 and toward away from the light incident surface 130. The predetermined direction P is, for example, parallel to the axial direction Z, but is not limited thereto. The second prism sheet 300 includes a plurality of second prism columns 310, which are disposed on a side of the second prism sheet 300 facing away the second light exit surface 120. The plurality of second prism columns 310 are arranged along the predetermined direction P. The first prism columns 210 and the second prism columns 310 extend, for example, along the axial direction X, that is, in the embodiment, the angle between the axial direction X and the predetermined direction P is 90 degrees, but is not limited thereto.

The light source 500 is, for example, a linear light source including a plurality of point light sources, wherein the point light sources are, for example, light emitting diodes (LEDs), but is not limited thereto. The light source 500 may also be other types of linear light sources, such as light tubes, and the invention does not limit the type of the light source.

The color conversion film 400 is used to convert and adjust the color of the incident light L. For example, when the light L emitted by the light source 500 is blue light, the light L may be converted into red light and green light through the color conversion film 400, and then mixed with blue light to become white light. The example is only an embodiment of the invention and is not intended to limit the color of the light L. The color conversion film 400 is, for example, quantum dot (QD), KSF+β-Sialon, YAG, etc., but it is not limited thereto. In another embodiment, when the light L provided by the light source 500 is white light, a diffusion sheet may be used instead of the color conversion film 400 to enhance the diffusion effect of the light L.

The first display panel 20 and the second display panel 30 are, for example, a liquid crystal display panel, but are not limited thereto. In other embodiments, the type of the liquid crystal display panel is, for example, a transmissive display panel or a semi-reflective/semi-transmissive display panel.

In the dual display device 1 of the embodiment, the light guide plate 100 of the light source module 10 has a plurality of first microstructures 111. Therefore, when the light L is irradiated on the first microstructures 111, part of the light L may be refracted and emitted from the first light exit surface 110 and part of the light L is reflected and emitted from the second light exit surface 120 to achieve the effect of emitting light on both sides. In addition, since the plurality of first prism columns 210 are disposed on a side of the first prism sheet 200 facing away the first light exit surface 110, when the light L irradiates the first prism sheet 200, not all of the light L would be incident but part of the light L would be reflected back to the light guide plate 100 due to the structure of the first prism columns 210. Similarly, since the plurality of second prism columns 310 are disposed on a side of the second prism sheet 300 facing away the second light exit surface 120, when the light L irradiates the second prism sheet 300, not all of the light L would be incident but part of the light L would be reflected back to the light guide plate 100 due to the structure of the second prism columns 310. Therefore, the number of times the light L passes through the color conversion film 400 is increased, and the color conversion efficiency is improved, thereby improving the light utilization efficiency. Therefore, the dual display device 1 of the embodiment only needs to use one set of the light source module 10 to meet the requirements of double-sided display, thereby having the advantages of thinner thickness and lighter weight.

The first display panel 20 includes, for example, a first polarizer 21 disposed on a side of the first display panel 20 adjacent to the first prism sheet 200. The second display panel 30 includes a second polarizer 31 disposed on a side of the second display panel 30 adjacent to the second prism sheet 300. At least one of the first polarizer 21 and the second polarizer 31 is an advanced polarization conversion film (APCF), but is not limited thereto. The first polarizer 21 has a first absorption axis L21, and the second polarizer 31 has a second absorption axis L31. An included angle between an axial direction of the first absorption axis L21 and an axial direction of the second absorption axis L31 is between 0 degrees and 90 degrees. In the embodiment, the axial direction of the first absorption axis L21 is, for example, parallel to the axial direction X, and the axial direction of the second absorption axis L31 is, for example, parallel to the axial direction Z. The included angle between an axial direction of the first absorption axis L21 and an axial direction of the second absorption axis L31 is 90 degrees.

When external light L1 enters the light source module 10 via the first display panel 20, for example, the first polarizer 21 may convert the external light L1 into polarized light perpendicular to the axial direction of the first absorption axis L21. Since the axial direction of the first absorption axis L21 and the axial direction of the second absorption axis L31 have an included angle in a range of 0 degree to 90 degrees (90 degrees in the embodiment), the external light L1, which is converted into the polarized light perpendicular to the axial direction of the first absorption axis L21, is parallel to the second absorption axis L31 and is absorbed by the second polarizer 31, so that this polarized light cannot pass through the second polarizer 31. Thereby, the interference in the imaging of the second display panel 30 at another side of the dual display device 1, caused by the external light L1 incident on the first display panel 20 from one side of the dual display device 1, may be reduced. Similarly, the interference in the imaging of the first display panel 20 at another side of the dual display device 1, caused by external light (not shown) incident on the second display panel 30 from one side of the dual display device 1, may also be reduced.

In the embodiment, although the axial direction of the first absorption axis L21 and the axial direction of the second absorption axis L31 have an included angle of 90 degrees as an example, the invention is not limited thereto. In another embodiment, the included angle between the axial direction of the first absorption axis L21 and the axial direction of the second absorption axis L31 is, for example, 0 degree, that is, the first absorption axis L21 and the second absorption axis L31 are in parallel. In this case, a similar effect can be achieved by selecting the first display panel 20 and the second display panel 30 with lower transmittance. For example, when the external light L1 is incident on the first display panel 20 with lower transmittance from one side of the dual display device 1, the brightness of the polarized light passing through the first display panel 20 is less than 10% of the brightness of the external light L1. As such, the interference in the imaging of the second display panel 30 at another side of the dual display device 1, caused by the external light L1 incident on the first display panel 20 from one side of the dual display device 1, may also be reduced.

When the first display panel 20 and the second display panel 30 are liquid crystal display panels, the first display panel 20 may further include a third polarizer 22 disposed on a side of the first display panel 20 facing away the first prism sheet 200, and the second display panel 30 may further include a fourth polarizer 32 disposed on a side of the second display panel 30 facing away the second prism sheet 300. Axial directions of absorption axes of the third polarizer 22 and the fourth polarizer 32 may be determined according to the types and properties of liquid crystals used in the first display panel 20 and the second display panel 30, and are not limited herein.

The dual display device 1 of the embodiment may, for example, further include a first cover sheet 40 and a second cover sheet 50. The first cover sheet 40 is disposed on a side of the first display panel 20 facing away the first prism sheet 200 and faces the third polarizer 22. The second cover sheet 50 is disposed on a side of the second display panel 30 facing away the second prism sheet 300 and faces the fourth polarizer 32. The first cover sheet 40 and the second cover sheet 50 are, for example, cover glass for providing functions of dust prevention and protection. In another embodiment, the first cover sheet 40 and the second cover sheet 50 further include a touch sensor layer so that the dual display device 1 may be provided with a touch function. It is also allowed to select and use just one of the first cover sheet 40 and the second cover sheet 50 in the above embodiments.

Figure 2:
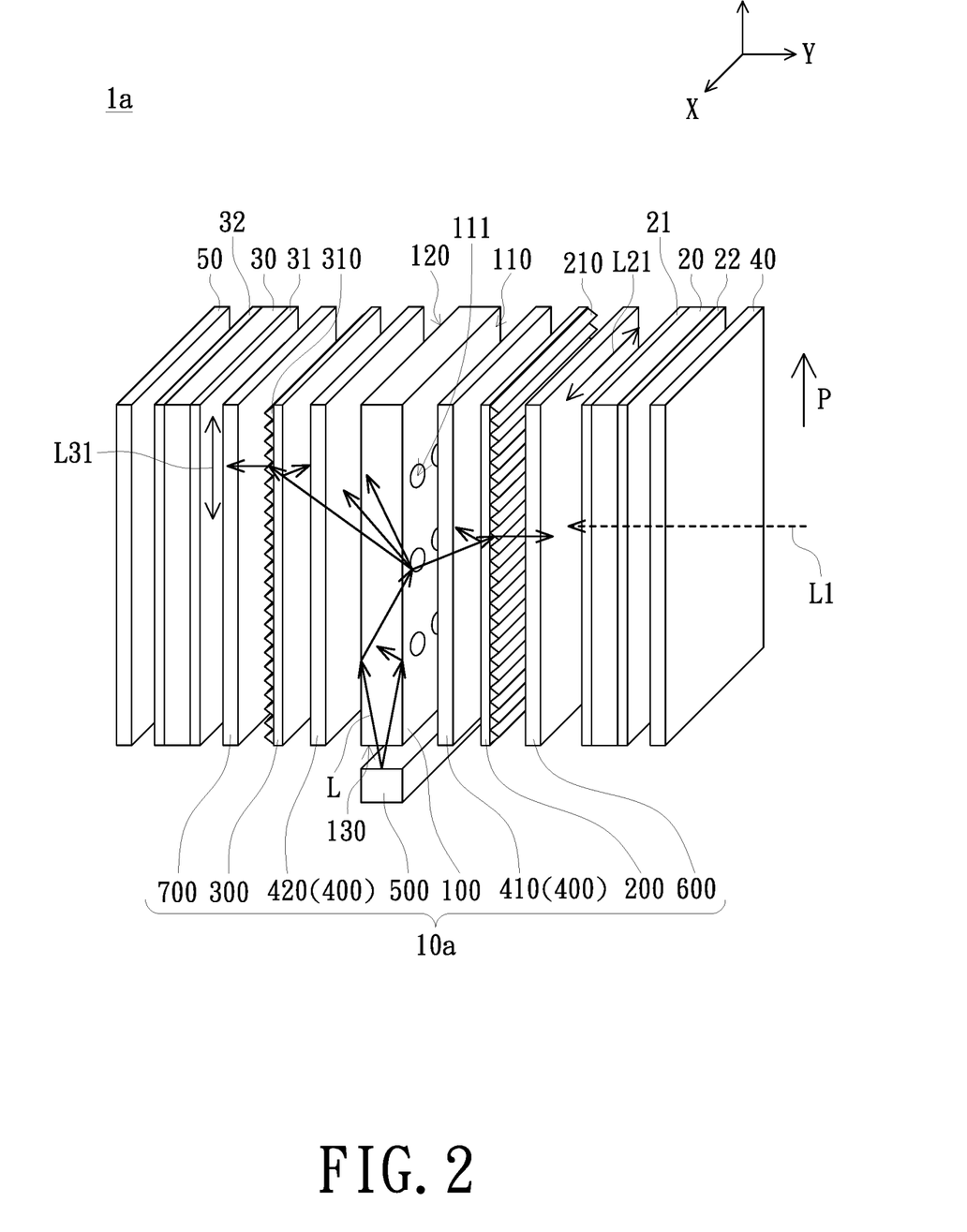
FIG. 2 is a schematic perspective cross-sectional view of a dual display device of another embodiment of the invention.

FIG. 2 is a schematic perspective cross-sectional view of a dual display device of another embodiment of the invention. Referring to FIG. 2, the dual display device 1a of the embodiment is similar in structure to the dual display device 1. The only difference is that the light source module 10a of the embodiment may further include a first optical film 600 and a second optical film 700. The first optical film 600 and the second optical film 700 are, for example, polarized brightness enhancement film, diffusion film, prism sheet, composite prism sheet, etc., but are not limited thereto. The first optical film 600 is disposed between the first prism sheet 200 and the first display panel 20. The second optical film 700 is disposed between the second prism sheet 300 and the second display panel 30. Depending on the function of the optical film, different types of optical films may be selected for the first optical film 600 and the second optical film 700. Alternatively, other optical films may be disposed between the first prism sheet 200 and the first display panel 20 in addition to the first optical film 600, or other optical films may be disposed between the second prism sheet 300 and the second display panel 30 in addition to the second optical film 700.

The optical film used in the embodiment is exemplified by one first optical film 600 and one second optical film 700. The first optical film 600 is, for example, a first polarized brightness enhancement film, having a first transmission axis (not shown) for passing the light L of the polarization direction in parallel with the first transmission axis and reflecting the light L of the polarization direction not in parallel with the first transmission axis. The second optical film 700 is, for example, a second polarized brightness enhancement film, having a second transmission axis (not shown) for passing the light L of the polarization direction in parallel with the second transmission axis and reflecting the light L of the polarization direction not in parallel with the second transmission axis. The first polarized brightness enhancement film 600 and the second polarized brightness enhancement film 700 are, for example, dual brightness enhancement film (DBEF), but are not limited thereto. In the embodiment, the first polarized brightness enhancement film 600 and the second polarized brightness enhancement film 700 may allow part of the light L, whose polarization directions are parallel to the first transmission axis and the second transmission axis, to pass therethrough, and reflect part of the light L of other polarization directions back to the light guide plate 100 for reuse, so that the light emitting efficiency may be improved. At the same time, the number of times the light L passes through the color conversion film 400 may also be increased, which improves the color conversion efficiency, thereby improving the light utilization efficiency.

Figure 3:
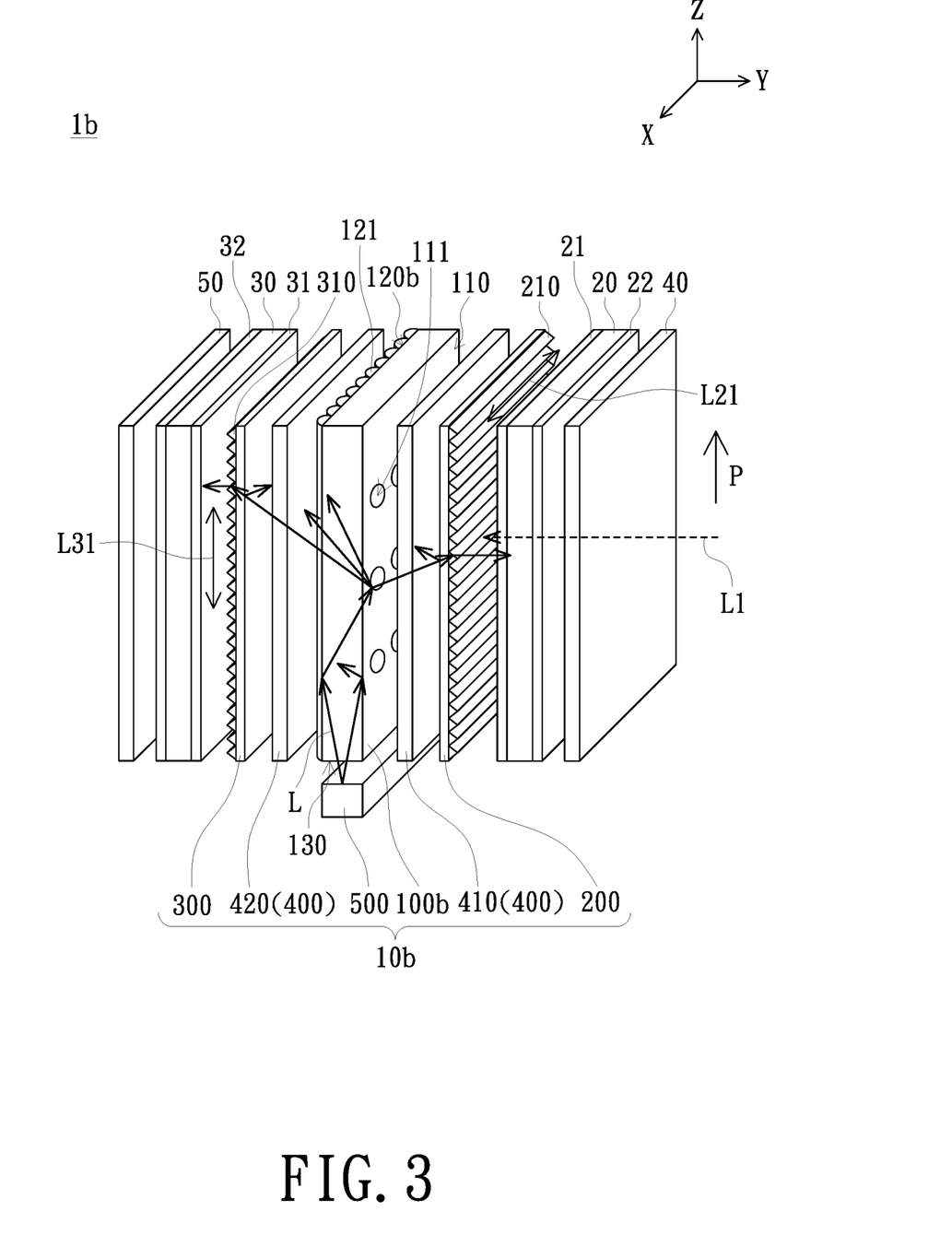
FIG. 3 is a schematic perspective cross-sectional view of a dual display device of another embodiment of the invention.

FIG. 3 is a schematic perspective cross-sectional view of a dual display device of another embodiment of the invention. Referring to FIG. 3, the dual display device 1b of the embodiment is similar in structure to the dual display device 1. The only difference is that in the light source module 10b of the embodiment, the second light exit surface 120b of the light guide plate 100b has a plurality of second microstructures 121. The plurality of second microstructures 121 are different from the plurality of first microstructures 111, for example, but the invention is not particularly limited. In another embodiment, the patterns of the plurality of second microstructures 121 may also be the same as the plurality of first microstructures 111. In the embodiment, the plurality of second microstructures 121 are exemplified by cylindrical prism structures, and each second microstructure 121 extends, for example, along the predetermined direction P and is arranged to the direction parallel to the light incident surface 130, but is not limited thereto. The plurality of second microstructures 121 may be dot-shaped microstructures, for example, and the quantity and shape of the second microstructures 121 are not particularly limited.

According to different design requirements, when the plurality of second microstructures 121 use prism structure, the light L irradiated on the plurality of second microstructures 121 may be uniformly emitted. When a plurality of second microstructures 121 use dot-like microstructure, the function of the second microstructures 121 is similar to that of the first microstructures 111, when the light L is irradiated on the second microstructures 121, part of the light L may be refracted and emitted from the second light exit surface 120, and part of the light L is reflected and emitted from the first light exit surface 110 to achieve the effect of emitting light on both sides.

In summary, in the dual display device of the embodiment of the invention, the light guide plate of the light source module has a plurality of first microstructures, when the light is irradiated on the first microstructures, part of the light may be refracted and emitted from the first light exit surface, and part of the light is reflected and emitted from the second light exit surface to achieve the effect of emitting light on both sides. In addition, since the plurality of first prism columns are disposed on a side of the first prism sheet facing away the first light exit surface, when the light irradiates the first prism sheet, not all of the light would be incident, part of the light would be reflected back to the light guide plate. Similarly, since the plurality of second prism columns are disposed on a side of the second prism sheet facing away the second light exit surface, when the light irradiates the second prism sheet, not all of the light would be incident, part of the light would be reflected back to the light guide plate. Therefore, the number of times the light passes through the color conversion film is increased, and the color conversion efficiency is improved, thereby improving the light utilization efficiency. Therefore, the dual display device of the embodiment of the invention only needs to use one set of the light source module to meet the requirements of double-sided display, having the advantages of thinner thickness and lighter weight.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "second", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first display panel, the second display panel, the first polarizer, the second polarizer, the third polarizer, the fourth polarizer, the first cover sheet, the second cover sheet, the first light exit surface, the second light exit surface, the first microstructure, the second microstructure, the first prism sheet, the second prism sheet, the first prism column, the second prism column, the first color conversion film, the second color conversion film, the first optical film, the second optical film, the first absorption axis and the second absorption axis are only used for distinguishing various elements and do not limit the number of the elements.

What is claimed is:

1. A dual display device, comprising:
   a light source module, comprising:
      a light guide plate, having a first light exit surface, a second light exit surface relative to the first light exit surface, and a light incident surface connected between the first light exit surface and the second light exit surface, wherein the first light exit surface has a plurality of first microstructures;
      a first prism sheet, disposed beside the first light exit surface of the light guide plate, wherein the first prism sheet comprises a plurality of first prism columns disposed on a side of the first prism sheet facing away the first light exit surface, and the plurality of first prism columns are arranged along a predetermined direction which is from the light incident surface and toward away from the light incident surface;
      a second prism sheet, disposed beside the second light exit surface of the light guide plate, wherein the second prism sheet comprises a plurality of second prism columns disposed on a side of the second prism sheet facing away the second light exit surface, and the plurality of second prism columns are arranged along the predetermined direction;
      a color conversion film, disposed at least one of between the first prism sheet and the first light exit surface and between the second prism sheet and the second light exit surface; and
      a light source, disposed beside the light incident surface;
   a first display panel, disposed on a side of the first prism sheet facing away the light guide plate; and
   a second display panel, disposed on a side of the second prism sheet facing away the light guide plate,
   wherein the light source module further comprises a first optical film and a second optical film, the first optical film is disposed between the first prism sheet and the first display panel, the second optical film is disposed between the second prism sheet and the second display panel,
   wherein the first optical film is a first polarized brightness enhancement film, having a first transmission axis for passing the light of the polarization direction in parallel with the first transmission axis and reflecting the light of the polarization direction not in parallel with the first transmission axis; the second optical film is a second polarized brightness enhancement film, having a second transmission axis for passing the light of the polarization direction in parallel with the second transmission axis and reflecting the light of the polarization direction not in parallel with the second transmission axis.

2. The dual display device according to claim 1, wherein the first polarized brightness enhancement film and the second polarized brightness enhancement film are dual brightness enhancement film.

3. A dual display device, comprising:
   a light source module, comprising:
      a light guide plate, having a first light exit surface, a second light exit surface relative to the first light exit surface, and a light incident surface connected between the first light exit surface and the second light exit surface, wherein the first light exit surface has a plurality of first microstructures;
      a first prism sheet, disposed beside the first light exit surface of the light guide plate, wherein the first prism sheet comprises a plurality of first prism columns disposed on a side of the first prism sheet facing away the first light exit surface, and the plurality of first prism columns are arranged along a predetermined direction which is from the light incident surface and toward away from the light incident surface;
      a second prism sheet, disposed beside the second light exit surface of the light guide plate, wherein the second prism sheet comprises a plurality of second prism columns disposed on a side of the second prism sheet facing away the second light exit surface, and the plurality of second prism columns are arranged along the predetermined direction;
      a color conversion film, disposed at least one of between the first prism sheet and the first light exit surface and between the second prism sheet and the second light exit surface; and
      a light source, disposed beside the light incident surface;
   a first display panel, disposed on a side of the first prism sheet facing away the light guide plate; and
   a second display panel, disposed on a side of the second prism sheet facing away the light guide plate,
   wherein the first display panel comprises a first polarizer disposed on a side of the first display panel adjacent to the first prism sheet, the second display panel comprises a second polarizer disposed on a side of the second display panel adjacent to the second prism sheet, the first polarizer has a first absorption axis, and the second polarizer has a second absorption axis, an included angle between an axial direction of the first absorption axis and an axial direction of the second absorption axis is between 0 degrees and 90 degrees.

4. The dual display device according to claim 3, wherein at least one of the first polarizer and the second polarizer is an advanced polarization conversion film.

5. The dual display device according to claim 3, wherein an included angle between an axial direction of the first absorption axis and an axial direction of the second absorption axis is 0 degrees.

6. The dual display device according to claim 3, wherein an included angle between an axial direction of the first absorption axis and an axial direction of the second absorption axis is 90 degrees.

7. The dual display device according to claim 1, wherein the second light exit surface has a plurality of second microstructures.

8. The dual display device according to claim 7, wherein the plurality of second microstructures are different from the plurality of first microstructures.

9. The dual display device according to claim 1, wherein the first display panel is a transmissive display panel or a semi-reflective/semi-transmissive display panel, the second display panel is a transmissive display panel or a semi-reflective/semi-transmissive display panel.

* * * * *